United States Patent [19]
Kobayashi

[11] Patent Number: 4,607,728
[45] Date of Patent: Aug. 26, 1986

[54] PAD SPRING FOR DISC BRAKE AND HAVING RESTRICTING PORTION

[75] Inventor: Kinzo Kobayashi, Kanagawa, Japan

[73] Assignee: Tokico Ltd., Kawasaki, Japan

[21] Appl. No.: 768,932

[22] Filed: Aug. 26, 1985

Related U.S. Application Data

[63] Continuation of Ser. No. 560,995, Dec. 13, 1983, abandoned.

[30] Foreign Application Priority Data

Dec. 20, 1982 [JP] Japan .......................... 57-192671[U]

[51] Int. Cl.⁴ ........................................... F16D 55/224
[52] U.S. Cl. .............................. 188/73.38; 188/73.39; 188/205 A
[58] Field of Search .............. 188/73.31, 73.36, 73.37, 188/73.38, 73.39, 73.45, 205 A, 206 R

[56] References Cited

U.S. PATENT DOCUMENTS 3,612,226 10/1971 Pauwels ..................... 188/73.36 X
4,181,200 1/1980 Souma ........................... 188/73.38

FOREIGN PATENT DOCUMENTS 55-65732   5/1980  Japan ......................... 188/73.38
57-190136 11/1982  Japan ......................... 188/73.37
2066911    7/1981  United Kingdom ............ 188/73.38
2079878    1/1982  United Kingdom ............ 188/73.38

Primary Examiner—Bruce H. Stoner, Jr.
Assistant Examiner—Richard R. Diefendorf
Attorney, Agent, or Firm—Wenderoth, Lind & Ponack

[57] ABSTRACT

A pad spring for use in a disc brake including a stationary member adapted to be secured to a non-rotatable part of a vehicle at one side of a rotatable disc and having two circumferentially spaced leg portions which straddle the outer circumference of the disc and mount slidably thereon a pair of friction pads, and a caliper slidably mounted on the stationary member. The pad spring has a base portion contacting with and extending along a side surface of the leg portion of the stationary member, a retaining portion extending from the base portion and retainingly engaging with the leg portion, a pressing portion extending from the base portion and resiliently engaging the radially outer surface of the friction pads, and a restricting portion extending from the base portion and to a position radially outwards of the pressing portion and being normally spaced therefrom by a predetermined distance.

4 Claims, 4 Drawing Figures

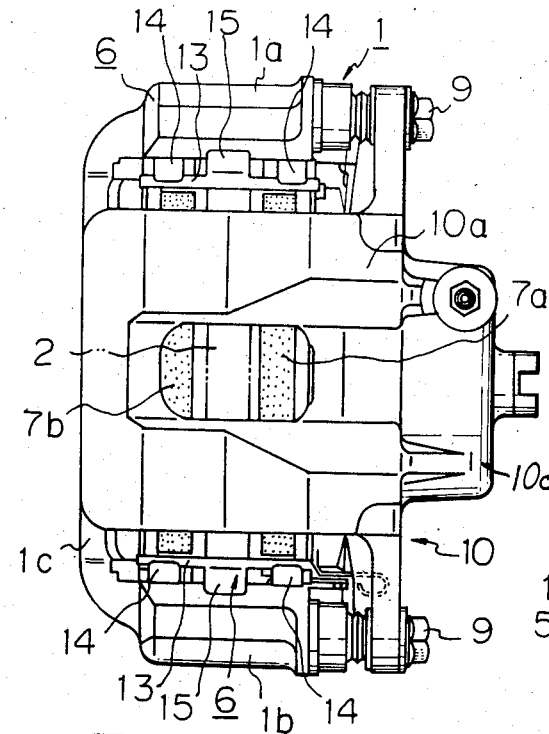
Fig. 1
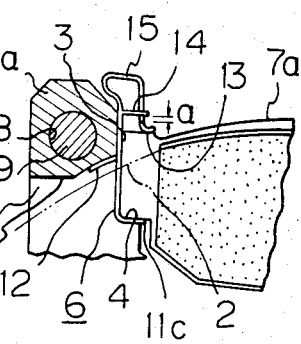
Fig. 3
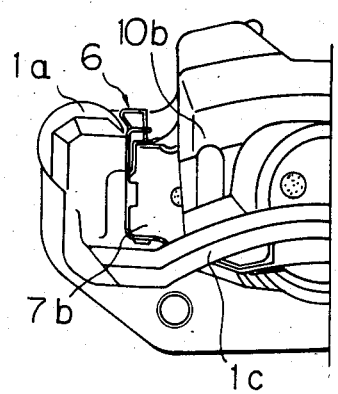
Fig. 2
Fig. 4

4,607,728

PAD SPRING FOR DISC BRAKE AND HAVING RESTRICTING PORTION

This application is a continuation of now abandoned application Ser. No. 560,995, filed Dec. 13, 1983.

BACKGROUND OF THE INVENTION

This invention relates to a disc brake and, particularly to a pad spring in a disc brake.

One typical prior art disc brake comprises a carrier or a stationary member adapted to be secured to a non-rotatable part of a vehicle at one side of a rotatable disc, a pair of friction pads disposed on opposite sides of the disc and slidably supported on the carrier for movement in the direction parallel to the axis of the disc, and a caliper supported on the carrier to slide in the direction parallel to the axis of the disc. The caliper has a generally inverted U-shaped configuration with one limb portion incorporating therein a hydraulic piston and cylinder mechanism for pressing one friction pad against one side surface of the disc, another limb portion being located contiguous to the rear surface of the other friction pad for pressing it against the other side surface of the disc and a bridge portion straddling the outer circumference of the disc and connecting integrally the two limb portions. Further, the carrier comprises two circumferentially spaced leg portions for supporting thereon the friction pads. The leg portions also straddle the outer circumference of the disc at locations on the opposite sides of the bridge portion of the caliper.

There is provided a pad spring in such disc brake for preventing the vibrations of the friction pad and assuring smooth sliding movement thereof relative to the carrier. It has been proposed to form the pad spring of a sheet metal with a base portion contacting and extending along a side surface of the leg portion, a retaining portion extending from the base portion and engaging with the leg portion and a pressing portion extending from the base portion and resiliently engaging with the radially outward surfaces of the friction pad. The friction pad is biased against the leg portion of the carrier by the spring force of the pressing portion, whereby the relative sliding movement of the friction pad is smooth and vibrations can reliably be prevented. However, there are shortcomings in that when the pressing portion is excessively deformed due to excessive vibrations or errors in the assembling or deassembling operation, the spring force of the pressing portion is decreased. Such shortcomings can be prevented by increasing the strength of the pressing portion, but this excessively increases the spring force and, accordingly the sliding resistance between the friction pad and the carrier increases and, further, since the spring constant increases also, the deviation in the dimension of the pad spring may sometimes have excessive effects on the spring force and it is difficult to control the spring force so that it is in a desired range.

SUMMARY OF THE INVENTION

The present invention has been made in view of aforesaid circumstances and the object thereof is to provide a disc brake having a pad spring of the aforementioned type wherein a restricting portion is provided which is located radially outwards of the pressing portion thereby restricting the radially outward displacement of the pressing portion. Preferably, the restricting portion is normally spaced from the pressing portion by a predetermined distance and, when the pressing portion is deformed radially outwards the predetermined distance, the spring force of the restricting portion acts to resist excessive deformation of the pressing portion.

BRIEF DESCRIPTION OF THE DRAWINGS

Further objects and advantages of the invention will become apparent from the following description taken with reference to drawings exemplifying a preferred embodiment of the invention, in which:

FIG. 1 is a plan view of a disc brake according to one embodiment of the invention;

FIG. 2 is a half view of the disc brake as viewed from the left side of FIG. 1;

FIG. 3 is a partially broken away enlarged view of FIG. 2, and

FIG. 4 is a perspective view of a pad spring shown in FIG. 3.

DETAILED DESCRIPTION OF THE PREFERRED EMBODIMENTS

In the drawings, shown at 1 is a carrier adapted to be secured to a non-rotatable part of a vehicle (not shown) at one side of a rotatable disc 2 and has two leg portions 1a and 1b which are spaced in the direction of the circumference of the disc. The leg portions 1a and 1b straddle the outer circumference of the disc 2 and extend to the opposite sides of the disc and are connected with each other by a bridge portion 1c. Further, the leg portions have opposing side surfaces 3, step portions 4 formed on the side surfaces 3 and facing in the radially outward direction with respect to the disc 2 and cutout portions 5 for receiving the outer circumference of the disc 2. A pair of friction pads 7a and 7b are mounted on the step portions 4 and on the opposite sides of the disc 2 and are slidable in a direction parallel to the axis of the disc 2. There are interposed between the friction pads and step portions pad springs 6 which are preferably formed of sheet metal such as stainless steel. A bore 8 is formed in each leg portion extending in a direction parallel to the axis of the disc, and one end of each of caliper supporting pins 9 is slidably fitted in a corresponding bore 8. A caliper 10 is secured to the other end of caliper supporting pins 9 so that the caliper 10 is mounted on the leg portions of the carrier 1 to slide in a direction parallel to the axis of the disc 2. The caliper 10 has a cylinder portion 10c disposed on one side of the disc 2 and incorporating therein a piston (not shown), a limb portion 10b disposed on the other side of the disc 2 and a bridge portion 10a integrally connecting the cylinder portion and the limb portion and extending generally parallel to the axis of the disc 2 and above the outer circumference of the disc 2 and the friction pads 7a and 7b. When oil under pressure is supplied into the cylinder portion the piston presses the friction pad 7a against one side surface of the disc 2 and, the reaction force displaces the caliper 10 in the rightward direction as viewed in FIG. 1 until the limb portion 10b presses the friction pad 7b against the other surface of the disc 2, whereby the disc 2 is effectively braked.

The pad spring 6 comprises a base portion 11 contacting with and extending along the side surface 3, a retaining portion 12 extending from the base portion 11 and engaging with the inner surface of the cutout portion 5 so as to retain the pad spring on the leg portion, a pressing portion 13 for resiliently pressing the friction pads 7a and 7b against the step portion 4 from radially outward of the friction pads, and a pair of restricting portions 14. More particularly, the base portion 11 consists of a pair of leg portions 11a and 11a, a bridge portion 11b connecting the upper (radially outer) portions of the leg portions 11a and 11a, and bent portions 11c which are formed by bending the lower end portions of the leg portions to abut with step portions 4. The bridge portion 11b straddles the outer circumference of the disc 2 and is connected to the retaining portion 12. Further, pawls 11d, and 11e are formed respectively on the opposite ends of the leg portions 11a and of the bent portions 11c in the direction parallel to the axis of the disc and, these pawls engage with opposite end surfaces of the leg portion of the carrier 1 in the direction parallel to the axis of the disc 2 thereby locating the pad spring with respect to the carrier 1.

The retaining portion 12 extends from the lower end of the bridge portion 11b in the direction circumferentially outward and radially inward in an inclined fashion and resiliently engages with the inner surface of the cutout portion 5. In FIG. 4, pawls are shown on axially opposite ends of the retaining portion 12 to engage with axially opposing inner surface of the cutout portion 5 thereby cooperating with pawls 11d and 11e aforementioned. But some of these pawls may be omitted. The retaining portion 12 cooperates with bent portions 11c to locate the pad spring in the radial direction.

The pressing portion 13 is connected to the upper end of the bridge portion 11b through a connecting portion 15 which generates the spring force of the pressing portion 13. The connecting portion 15 shown in the drawings consists of an inclined portion extending from the upper end of the bridge portion 11b in a radially outward and circumferentially outward direction, a horizontal portion extending in a circumferentially inward direction from the outer end of the inclined portion, and a vertical portion extending radially inward from the horizontal portion and connected to the pressing portion 13 which has a generally semi-circular cross-section and extends in a direction parallel to the axis of the disc. It will be understood that the configuration of the connecting portion 15 may be changed as desired such as to a loop-like shape or the like provided that the desired spring force is afforded on the pressing portion 13. The pressing portion 13 is elongated in the direction parallel to the axis of the disc so that the friction pads 7a and 7b are pressed against the step portions 4 during the sliding movement therealong.

The restricting portions 14 extend respectively from the upper ends of leg portions 11a to a position radially outwards of the pressing portion 13 and, in the normal assembled condition, are spaced radially outwardly from the pressing portion 13 by a predetermined distance a. The distance a is determined such that the displacement of the connecting portion 15 due to the displacement of the pressing portion 13 is within the elastic limit and within the fatigue limit of the connecting portion 15. It will be understood that when the displacement of the pressing portion 13 exceeds the distance a, the spring force of the restricting portions 14 also acts on the pressing portion 13.

Therefore, even though a large force acts on the pressing portion 13 due to a condition such as operational errors in assembling or deassembling operations or to excessive vibrations in operating the vehicle or during vibration tests, the displacement of the pressing portion 13 exceeding the predetermined distance a is restricted by the restricting portions 14, and thus the spring constant of the pad spring 6 or of the connecting portion 15 which makes possible the change in the spring force due to the dimensional tolerance, and smooth sliding movement of the friction pads with respect to the carrier 1 can be assured.

Although the description has been given with respect to one preferred embodiment of the invention, but, it will be understood that the invention is not limited to the embodiment and the embodical configuration of the pad spring may be changed as desired, for example a plural number of connecting portions 15 may be provided to connect the pressing portion 13 with the base portion 11, the number, location and the configuration of the restricting portions 14 may be determined as desired, and the bent portions 11c may be omitted with the lower end of the base portion 11 abutting directly with the step portion 4.

As described heretofore, according to the invention, a restricting portion is provided on the pad spring for restricting excessive displacement of the pressing portion, and thus it is possible to determine key the spring force acting on the pressing portion at a desired relatively low level and to restrict excessive displacement of the pressing portion in the direction separating from the friction pads, and to prevent the permanent deformation of the pad spring.

What is claimed is:

1. A pad spring for use in a disc brake of the type having a stationary member adapted to be secured to a non-rotatable part of a vehicle on one side of a rotatable disc and having two leg portions spaced in the direction of the circumference of the disc, at least one friction pad location between and supported on the leg portions of the stationary member and slidable in a direction parallel to the axis of the disc, a caliper mounted on the stationary member and slidable in a direction parallel to the axis of the disc, and a pair of pad springs provided between the friction pad and the stationary member, each pad spring comprising:

a base portion contacting with and extending along a circumferentially facing side surface of each leg portion of the stationary member;

a retaining portion extending from the base portion and engaging with the leg portion for retaining the spring in position on the leg portion;

a pad pressing means consisting of a single pressing portion extending in a direction parallel to the axis of the disc and rigid against bending radially of the friction pad and slidingly engaging a radially outward surface of the friction pad, and a resilient connecting portion extending radially outwardly from said pressing portion and in the circumferential direction and connecting said pressing portion with said base portion for resiliently biasing said pressing portion as a whole in the radially inward direction; and a pair of restricting portions separate from and spaced in the axial direction from said resilient connecting portion on opposite sides thereof and extending circumferentially from said base portion to a position spaced radially outwardly of said pressing portion in the path of radial outward movement of said pressing portion when a friction pad moves radially outwardly, said restricting portion being normally spaced radially outwards from said pressing portion by a predetermined distance for permitting radial outward movement of said pressing portion but less than a distance which would excessively distort said connecting portion, whereby when the displacement of said pressing portion exceeds said predetermined distance, the combined spring force of said resilient connecting portion and said restricting portion acts on said pressing portion.

2. A pad spring according to claim 1 wherein the leg portions straddle the outer circumference of the disc and slidably support a pair of friction pads thereon located on opposite sides of the disc, and said pressing portion extends parallel to the axis of the disc a distance for engaging both pads.

3. A pad spring according to claim 1 wherein the pad spring is made of a resilient metal.

4. A pad spring according to claim 3 wherein the metal is stainless steel.

* * * * *